United States Patent [19]

Stringfellow et al.

[11] Patent Number: 5,361,165

[45] Date of Patent: * Nov. 1, 1994

[54] REFLECTIVE CLUSTER DISPLAY WITH STOWABLE VIEWING SCREEN

[75] Inventors: Steven A. Stringfellow, Oakland; John M. Zelenak, West Bloomfield, both of Mich.

[73] Assignee: General Motors Corporation, Detroit, Mich.

[*] Notice: The portion of the term of this patent subsequent to Mar. 30, 2010 has been disclaimed.

[21] Appl. No.: 987,889

[22] Filed: Dec. 9, 1992

Related U.S. Application Data

[63] Continuation-in-part of Ser. No. 816,919, Jan. 3, 1992, Pat. No. 5,198,936.

[51] Int. Cl.⁵ .............................................. G02B 27/10
[52] U.S. Cl. ................................... 359/631; 359/632; 359/633; 340/461; 345/9
[58] Field of Search ............... 359/631, 633, 839, 838, 359/863, 859, 858, 884; 340/705, 840, 461

[56] References Cited

U.S. PATENT DOCUMENTS

| | | | |
|---|---|---|---|
| 3,950,072 | 4/1976 | Aten | 350/110 |
| 4,294,515 | 10/1981 | Kaufman | 350/174 |
| 4,635,033 | 1/1987 | Inukai et al. | 340/52 |
| 4,908,611 | 3/1990 | Iino | 340/705 |
| 4,967,191 | 10/1990 | Iino | 340/705 |
| 4,973,942 | 11/1990 | Iino | 340/438 |
| 5,028,119 | 7/1991 | Hegg et al. | 350/174 |
| 5,048,927 | 9/1991 | Inoue et al. | 359/618 |
| 5,198,936 | 3/1993 | Stringfellow | 359/831 |

Primary Examiner—Jon W. Henry
Attorney, Agent, or Firm—Anthony Luke Simon

[57] ABSTRACT

A display apparatus includes an image source displaying information and a magnifying mirror element reflecting the displayed information and projecting one or more images thereof viewable by the operator in one or more focal planes, the mirror element being partially light transmissive. A display data source is also provided so that, in a first mode, the display data is not visible and in a second mode the display data is visible to the operator through the mirror. A motor mechanism is operable to pivot the display between a stowed position and an unstowed operational position.

14 Claims, 5 Drawing Sheets

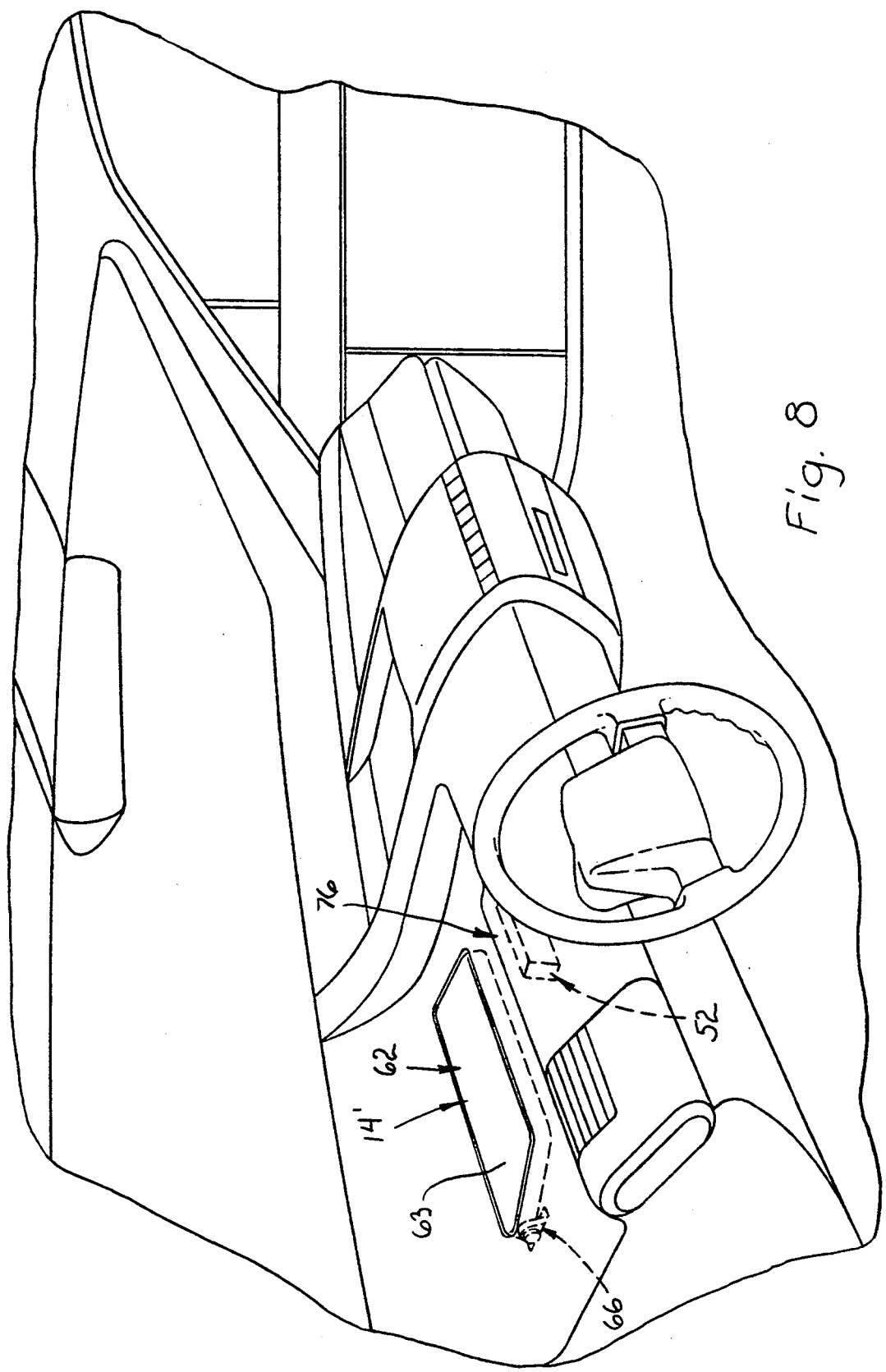

REFLECTIVE CLUSTER DISPLAY WITH STOWABLE VIEWING SCREEN

This application is a continuation-in-part of pending U.S. patent application, Ser. No. 07/816,919, filed Jan. 3, 1992, now U.S. Pat. No. 5,198,936 assigned to the assignee of this invention.

This Application pertains to displays and more particularly to reflective displays for motor vehicles.

BACKGROUND OF THE INVENTION

As vehicle manufacturers progress in vehicle designs, new and innovative looks are desirable for the vehicle interior. In the area of instrumentation, design goals include providing instrumentation that is easier to read, less costly, less bulky, less heavy and more flexible. Obtaining some or all of these goals opens the door for innovative design of vehicle interiors in ways currently restricted by conventional instrumentation clusters.

SUMMARY OF THE PRESENT INVENTION

This invention provides a display suitable for use in vehicle instrumentation that is easy to read, inexpensive, not bulky, light weight, design flexible, and provides an innovative look to the vehicle interior. The invention provides a display viewable to the vehicle operator that is a projected reflection of an image source. The display provides a magnified image to the operator, so that the image source need not be as large as that in conventional displays. The reduced size of the image source correspondingly provides for reduced weight, expense and energy consumption.

This invention additionally provides a display easier to read than conventional displays as the projected image may appear several feet in front of the operator, so that substantial refocusing of the eye from viewing the road is not necessary. According to the apparatus of this invention, the projected display appears in combination with non-projected information in an innovative manner.

Structurally, the apparatus of this invention comprises an image source displaying information and a means for reflecting the displayed information to project an image thereof viewable by an operator. The reflecting means is partially light transmissive and a means, mounted opposite the reflecting means from the image source, provides display data that is normally invisible to the operator, but when lit is visible to the operator through the reflecting means in combination with the projected image. A means for pivoting the reflecting means on an axis allows the reflecting means to have a stowed position and an operational open position.

BRIEF DESCRIPTION OF THE DRAWINGS

FIG. 8 illustrates the apparatus of this invention in the fold-down position in an automotive instrumentation panel.

DETAILED DESCRIPTION OF THE INVENTION

Figure 1:
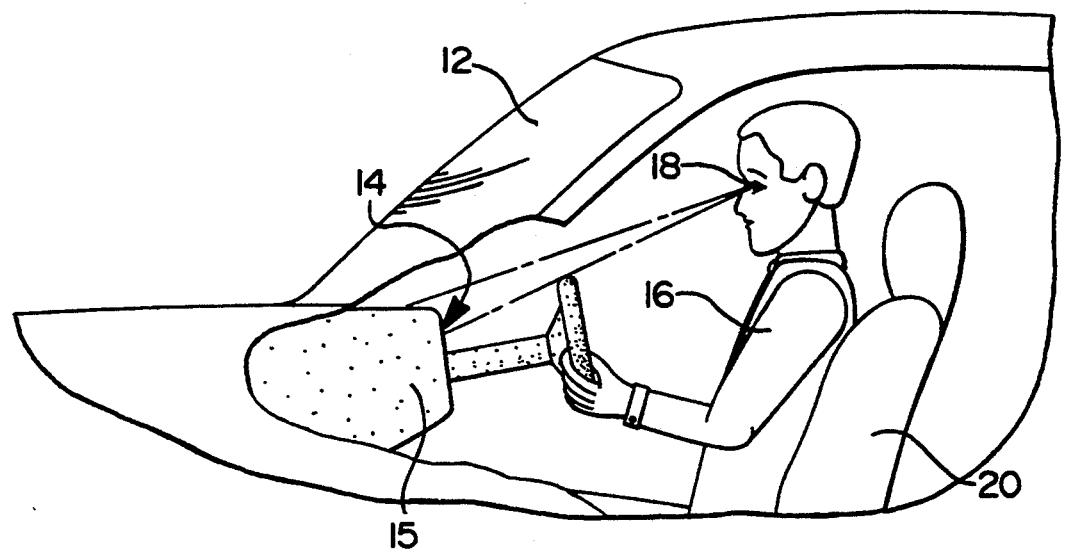
FIG. 1 is a schematic diagram of an example of this invention in an automotive vehicle.

Referring to FIG. 1, the schematic diagram shows a partial view of an automotive vehicle, including operator 16, driver seat 20, instrument panel 15 and vehicle windshield 12. The operator's eyes 18 view the display apparatus of this invention 14 mounted in the instrument panel 15 of the vehicle.

The position of mounting the display apparatus of this invention is flexible, and may be determined by the type of information displayed by the apparatus. In certain implementations, more than one display apparatus according to this invention may be mounted in a single vehicle, with each display apparatus displaying different information.

The display apparatus 14 is mounted approximately one meter from the operator's eyes 18, but projects a display image that appears further from the operator, preferably two to three meters. This projection of the display allows the operator to view the display without substantial refocusing of the eyes 18 from viewing the road through windshield 12.

Figure 3:
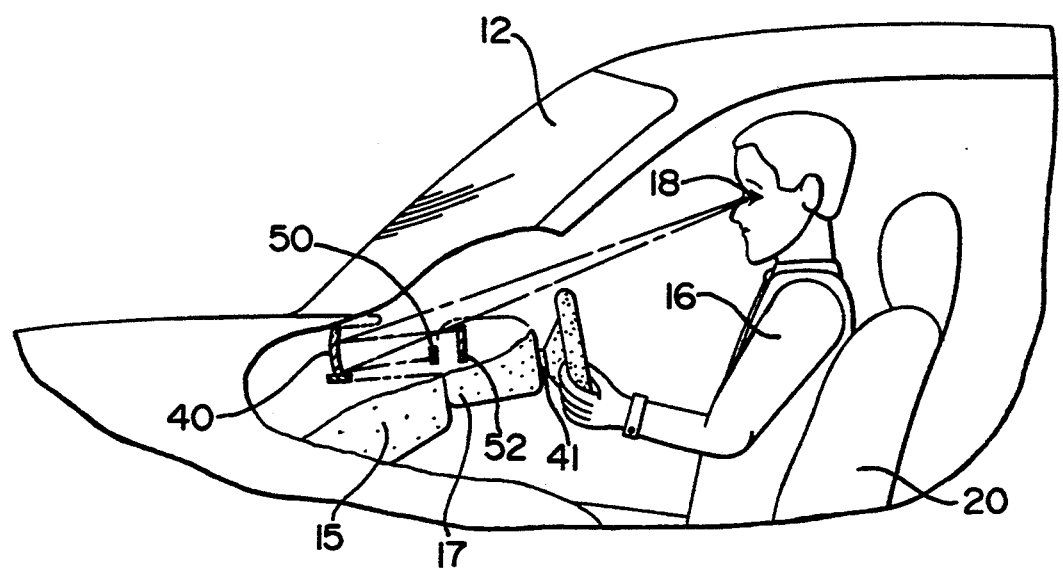
FIG. 3 is an example implementation of the invention.
Figure 2:
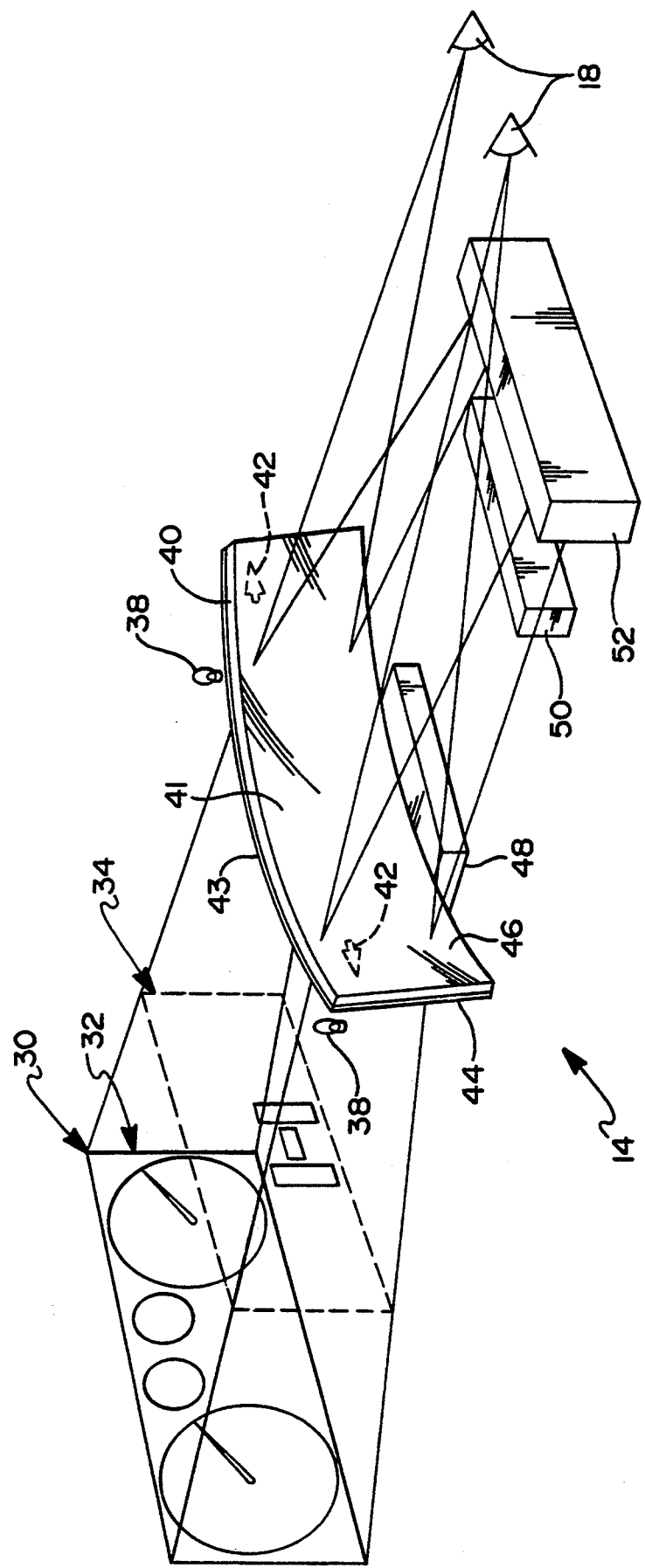
FIG. 2 is an illustration of the apparatus of this invention.

Referring to FIG. 2, the preferred implementation of this invention includes first and second image sources 52 and 50, mirror 40, and light source 38. The image sources 52 and 50, mirror 40 and light source 38 may be mounted in a housing (not shown) in or on the vehicle instrument panel 15. The image sources need not be packaged with the mirror 40 and may be provided with separate housings. In the example shown in FIG. 3, the image sources 52 and 50 are mounted in a pod 17 on the steering column 41 and the mirror 40 is mounted in the instrument panel 15 as shown.

An example implementation of image source 52 may be a lighted gauge cluster, similar to gauge clusters conventionally used, but having a reduced size and displaying a mirror image of the desired display information. The gauge cluster is reduced size because mirror 40 projects a magnified image 32 of image source 52, reducing the necessary size and weight of the gauge cluster. The image source displays a mirror image of the desired display information because the projected image is a mirror image of the image source display, with the result being a properly readable display. The gauge cluster may be either flood lit or back lit, both of which implementations are well known to those skilled in the art.

An example implementation of image source 50 may be a flat panel display, such as a vacuum fluorescent display, or a lighted LCD display. The image source 50 may provide display information supplemental to the display information provided by image source 52. Mirror 40 projects a magnified virtual image 36 of image source 50.

Mirror 40 is a substantially spherical concave mirror having a radius preferably 40 to 60 inches and has a first surface 41 facing image source 52 and a second surface 43 opposite image source 52. Mirror 40 is mounted in mount 48, which may be easily implemented by one skilled in the art to provide for adjustable tilt of the mirror so that the projected image may be positioned in view of operator 16.

Figure 4:
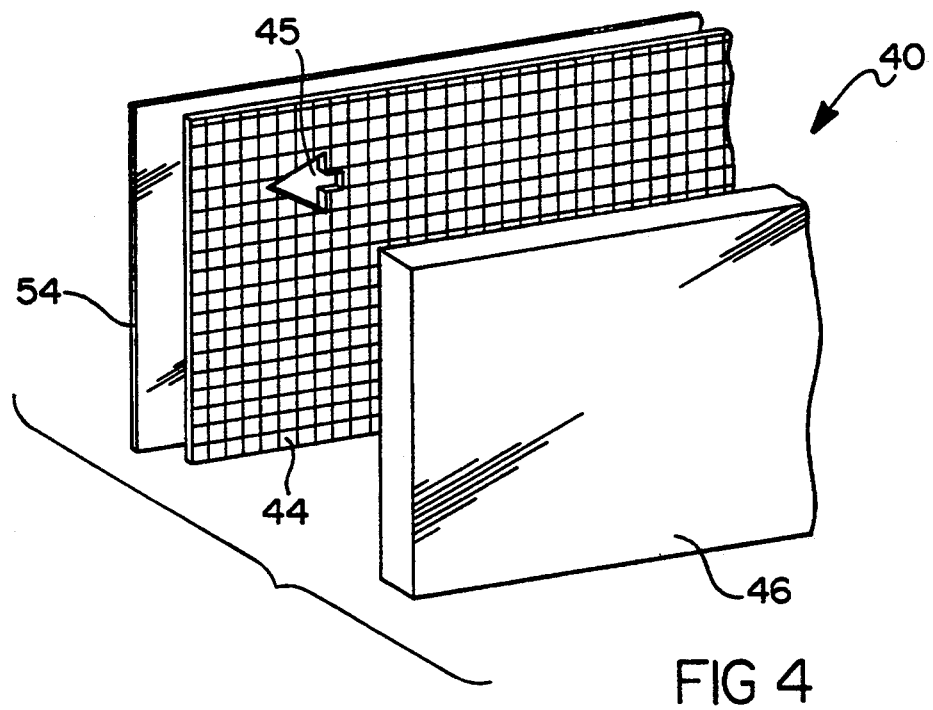
FIG. 4 is an exploded view of the mirror shown in FIG. 2.

Referring to FIG. 4, mirror 40 includes partially transparent mirror 46 and mask layer 44. The partially transparent mirror 46 may comprise any form of substantially reflective mirror, such as a molded dark plastic mirror. Partially transparent mirror 46 reflects the information displayed by the image source to project an image viewable by the operator and is partially light transmissive.

Figure 5:
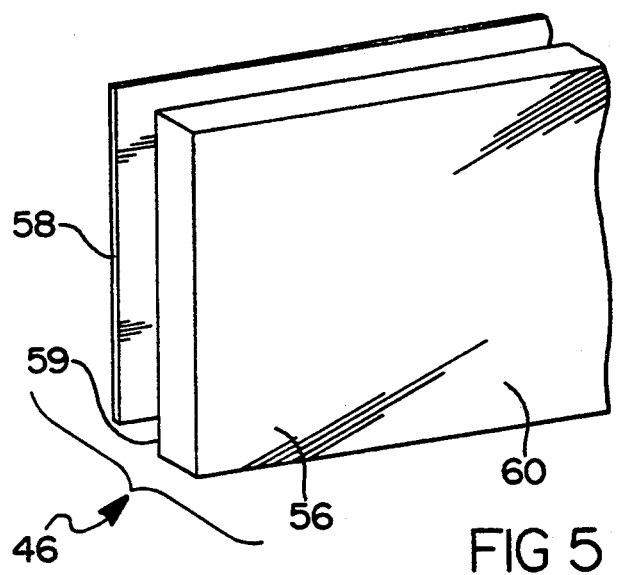
FIG. 5 is a view of an example implementation of the optical element shown in FIG. 4.

FIG. 5 shows another example implementation of partially transparent mirror 46, including optical element 56 and coating 58. Optical element 56 may be constructed of clear glass, plastic, or any other suitable substantially transparent material. Coating 58 is a partially light transmissive reflective coating applied to either surface 59 or surface 60 of optical element 56. Coating 58 may be a reflective aluminum or stainless steel coating, for a metallic or silver type mirror, or may be a layer of dark colored plastic for a dark color type mirror. In summary, partially transparent mirror 46 may be any partially transparent substantially reflective mirror.

Referring again to FIG. 4, mask layer 44 comprises an opaque coating or layer applied to the surface of partially transparent mirror 46 opposite from image source 52 (FIG. 2). Mask layer 44 may comprise an opaque paint and defines graphics 45, which may be any sort of display data desired, preferably by masking all areas that are not to appear as the display data. Layer 54 represents a clear coat which may be applied to protect the mask layer 44 in the case of a plastic optical element. In the case of a glass optical element, layer 54 may represent a plastic layer (similar to the PVB layer used in vehicle windshields) to prevent the glass optical element from shattering. If the plastic layer is provided in an opaque color, the plastic layer can also constitute the mask layer 44.

Referring again to FIG. 2, light source 38 comprise a means for sourcing light to the display data defined by mask layer 44. The display apparatus has two modes of operation: a first mode in which the light source 38 provides no light to the display data, so that the display data remains substantially invisible to the operator's eyes 18, hidden by partially transparent mirror 46 and so that only the projected information is visible to the operation; and a second mode in which the light source 38 provides light to the display data, so that when the display data receives the light, the display data becomes visible to the operator through partially transparent mirror 46, and appears in combination with the projected information.

In the example shown, light source 38 comprises two incandescent bulbs that selectively supply light to the display data to provide telltale information to the operator. Alternative light sources such as LEDs, vacuum fluorescent displays or remotely located light sources using light pipes to transmit light to the display data may also be used. If a vacuum fluorescent display is implemented, the mask layer 44 need not define the display data, as the vacuum fluorescent display may define the display data. In this implementation, the mask layer 44 may be omitted completely, or partially in the area of the vacuum fluorescent display.

In operation, the display apparatus 14 provides information in at least two planes visible to the operator. The first image source 52 provides a display image in the first image plane 30 (the first image plane). The light source 38 and masked graphics 45 provide a display in the plane of the mirror 40. If second image source 50 is used, then a display image in the second image plane (which is the third display plane) is also visible.

The information and data displayed by the apparatus of this invention may be any information which it is desirable to display in a vehicle instrument panel. One example implementation may comprise the first image source 52 displaying gauge information while the light source 38 and defined graphics 45 display telltale information. In another example, first image source 52 may display radio information and the light source 38 and graphics 45 display telltale information.

Messages of the display data in the plane of mirror 40 may be made to appear directly over the projected image(s). For example, if the projected image is the fuel gauge, the display data may be the low fuel telltale, which can be positioned to appear over the fuel gauge. Both the telltale and the fuel gauge are easily readable since they are in different focal planes, but the closer focal plane of the telltale tends to attract the operator's attention. Of course, the display data may contain any message and may or may not be superimposed on the projected image, as the system designer desires.

The possible combinations of information displayed by this invention may be infinite, with no particular information combination being required by this invention.

Figure 6:
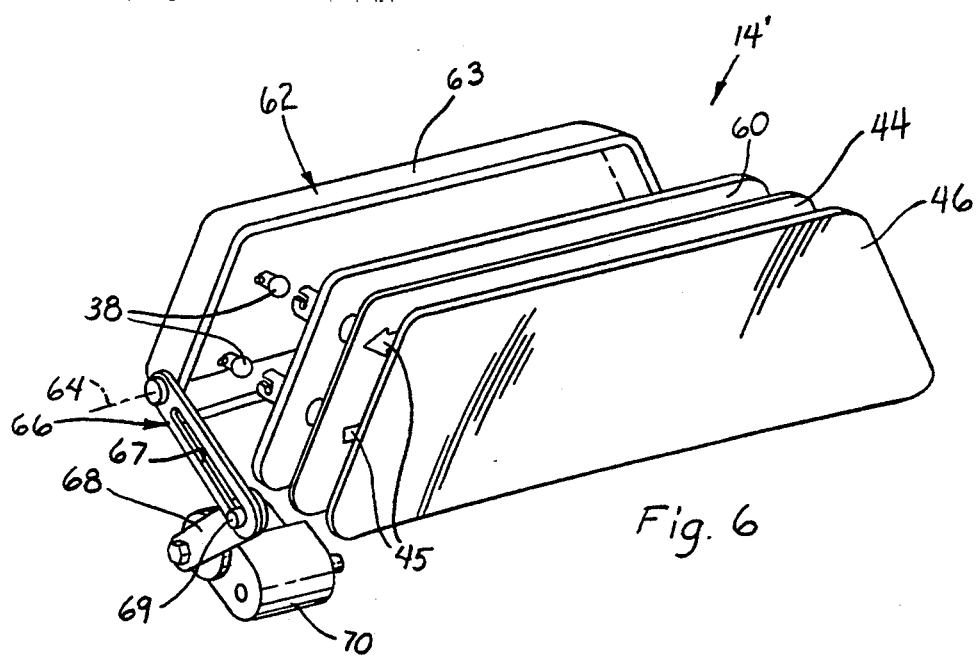
FIG. 6 is a view of the preferred implementation of this invention.
Figure 7:
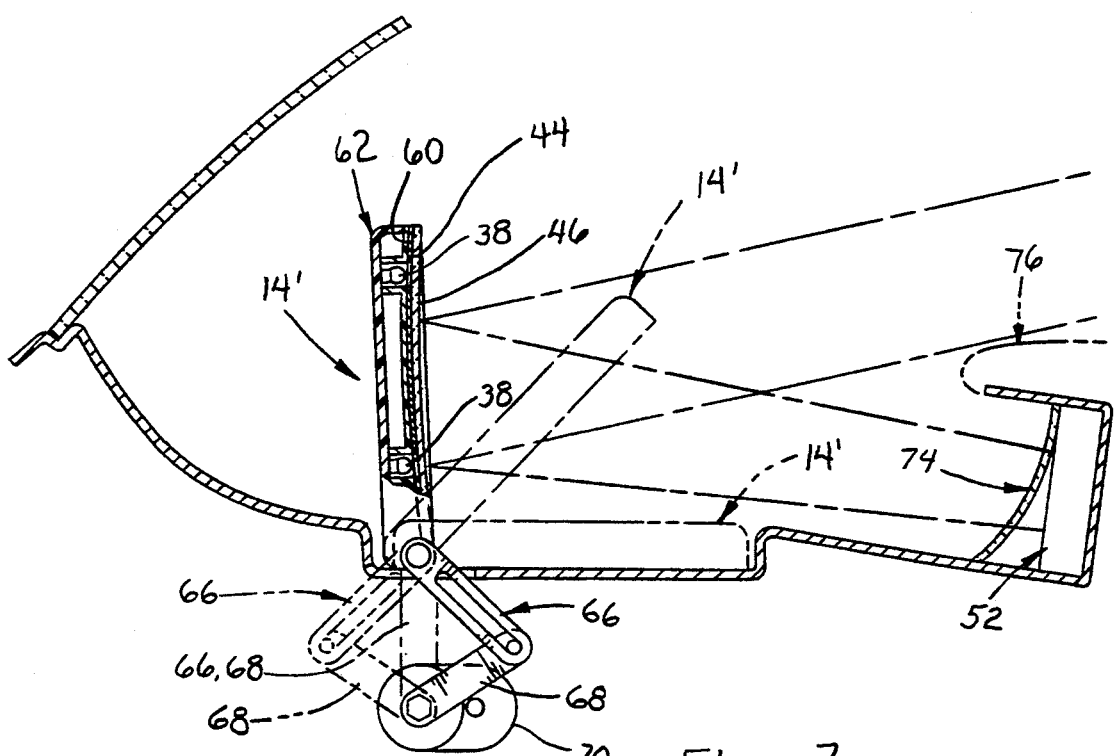
FIG. 7 illustrates the tilting and adjustment mechanism of this invention.

Referring now to FIG. 6, the mirror assembly 14' of this invention is shown with means 72 for pivoting the mirror assembly 14' about an axis 64 allowing stowing of the mirror assembly 14', as shown in FIG. 7, and allowing position adjustment of mirror assembly 14' to accommodate viewer preferences. The pivoting means 72 comprises electric motor 70 that may easily be implemented by those skilled in the art with control buttons (not shown) for controlling and reversibly driving motor 70.

Mirror assembly 14' comprises partially transparent mirror 46, mask layer 44, mask and graphic patterns 45, bulb retainer bracket 60 and housing 62. Bulb retainer bracket 60 comprises a plastic or metal bracket adapted to fit within housing 62 and retain light sources 38 in place while allowing light sources 38 to illuminate telltales/graphics defined by mask layer 44.

Arm 66 (mirror assembly arm) is fixedly attached to mirror assembly 14' at axis 64. The combination of the mirror assembly 14' and arm 66 are pivotally mounted at axis 64 in or on a vehicle instrumentation panel. The assembly of the electric motor 70 and 90 degree pivoting arm 68 comprise a standard 90 degree motor readily available to those skilled in the art.

Arm 68 (90 degree pivoting arm) has a pin 69 that engages elongated slot 67 of arm 66. As motor 70 causes arm 68 to move back and forth in its approximately 90 degree range of motion, pin 69 engages slot 67 and causes arm 66 to pivot about axis 64 which, in turn, causes the mirror assembly 14' to pivot about axis 64. Small movements of motor 70 allow adjustment of the mirror assembly 14' when the assembly is in the up and operational position and large movements of motor 70 allow the mirror assembly 14' to pivot between stowed and unstowed positions, as shown in FIG. 7.

FIG. 7 shows image source 52 placed under brow 72, which assembly may be above or comprise part of the steering column of the vehicle. Glare shield 74 comprises an elliptical light trap protecting image source 52 from glare in a manner well known to those skilled in the art.

Referring to FIG. 8, the apparatus of this invention is shown with the mirror assembly 14' pivoted down into a stowed position. According to this invention, housing 62 has, on its exterior 63, a layer of colored plastic, vinyl, leather, metal or other suitable material, allowing mirror assembly 14' to blend in with the top of the vehicle instrument panel 78 when the mirror assembly is folded in the down and stowed position shown in FIG. 8. If a designer does not wish housing 62 to blend into the instrument panel 78, then the designer may alter the coloring and design of the housing exterior 63 to accomplish desired styling results.

Housing 62 may be implemented to allow easy removal thereof for replacement of light bulbs 38 when necessary.

Advantageously, the design of the tell-tales/graphics defined by mask layer 44 may be easily altered by simply changing the mask design and location of bulbs 38.

Referring to FIGS. 6, 7 and 8, the preferred implementation of the apparatus of this invention has at least three modes of operation. In a first mode of operation, the display apparatus is inoperative and is characterized by the mirror assembly 14' folded into the stowed position. In the second mode of operation, information generated by image source 52 in a vehicle instrumentation panel is reflected off of the display mirror 46 and viewed by the driver as a projected virtual image display. In a third mode of operation, one or more light sources 38 illuminate tell-tales defined by mask 44 and provide display data information substantially at the plane of the mirror 46.

The above description contains example implementations of this invention whose scope is not limited by the literal details of the above description. Moreover, various other improvements and modifications to this invention may occur to those skilled in the art and fall within the scope of this invention as defined below.

The embodiments of the invention in which an exclusive property or privilege is claimed are defined as follows:

1. A vehicle display device comprising:
   an image source displaying information;
   a spherical concave mirror, mounted near the image source, reflecting the displayed information to project a virtual image thereof viewable by an operator, the spherical concave mirror comprising (i) a partially transparent mirror with a first surface facing the display source and a second surface opposite the display source and (ii) a mask layer on the second surface of the partially transparent mirror defining display data normally not visible to the operator;
   means, positioned proximate to the partially transparent mirror opposite the image source, for sourcing light onto the defined display data, so that when the defined display data receives the light, the display data becomes visible to the operator; and
   means for pivoting the partially transparent mirror, with respect to an axis, between a first position characterized as a stowed position and a second position characterized as an unstowed operational position.

2. The apparatus set forth in claim 1, wherein the partially transparent mirror comprises:
   a primarily transparent optical element with two surfaces, one facing the image source and the other opposite the image source; and
   a partially transparent reflective coating on at least one of the two surfaces of the optical element.

3. The apparatus set forth in claim 1, wherein the image source comprises a primary source mounted in a first source plane and a secondary source mounted in a second source plane, whereby the virtual image comprises a primary virtual image in a first image plane and a secondary virtual image in a second image plane.

4. The apparatus set forth in claim 2, wherein the partially transparent reflective coating is a metallic coating.

5. The apparatus set forth in claim 2 wherein the partially transparent reflective coating is a dark color coating.

6. The apparatus set forth in claim 2 wherein the partially transparent reflective coating is a black coating.

7. The apparatus set forth in claim 4 wherein the metallic coating comprises at least one element of a set including aluminum and stainless steel.

8. The apparatus of claim 1, wherein the pivoting means comprises a motor assembly with a 90 degree pivoting arm.

9. The apparatus set forth in claim 1, also comprising a mirror assembly, the mirror assembly comprising the spherical concave mirror and the means for sourcing light, wherein the mirror assembly also comprises a housing within which the spherical concave mirror and means for sourcing light are mounted.

10. The apparatus set forth in claim 9 wherein the mirror assembly housing comprises an outer layer comprising at least one member of a set comprising: plastic, vinyl, leather and metal.

11. The apparatus set forth in claim 10, wherein, the mirror assembly is mounted on a vehicle instrumentation panel, and wherein the outer layer blends in with the vehicle instrumentation panel when the mirror assembly is stowed.

12. The apparatus set forth in claim 9, also comprising:
   a mirror assembly arm fixedly mounted to the mirror assembly, the mirror assembly arm including an elongated slot;
   a motor assembly with a 90 degree pivoting arm; and
   a pin, mounted to the 90 degree pivoting arm and engaging the elongated slot, wherein the motor assembly, pin and mirror assembly arm operate to pivot the mirror assembly between the stowed and unstowed positions.

13. The apparatus set forth in claim 12, wherein the motor assembly, pin and mirror assembly arm operate to provide position adjustment of the mirror assembly in the unstowed position.

14. The apparatus set forth in claim 1, wherein the apparatus is characterized by at least three modes of operation, including a first mode in which the mirror assembly is stowed and not operational, a second mode in which the mirror assembly is unstowed and the image source projects the virtual image, and a third mode in which the mirror assembly is unstowed and the display data is visible to the operator.

* * * * *